UNITED STATES PATENT OFFICE.

RENÉ LAIGLE, OF PARIS, FRANCE.

FILAMENT FOR INCANDESCENT-GAS-LAMP MANTLES.

966,927.        Specification of Letters Patent.        Patented Aug. 9, 1910.

No Drawing.      Application filed December 31, 1907. Serial No. 408,802.

*To all whom it may concern:*

Be it known that I, RENÉ LAIGLE, citizen of France, residing at Paris, in the Republic of France, have invented new and useful Improvements in Filaments for Incandescent-Gas-Lamp Mantles, (for which a French patent has been filed October 11, 1907,) of which the following is a specification.

This invention has for its object the production of an infusible and indestructible filament intended for the manufacture of mantles for incandescent gas lamps. This object is effected by mixing certain oxids of the rare earths such as those of thorium, cerium and the like, with another oxid, such as the oxid of beryllium, which has a lower melting point than that of such earthy material, though it may be infusible except at very high temperatures. I add to this mixture alumina and silica with enough of the active principle of some agglutinant gum to convert it into a pasty mass, from which filaments may be successively drawn by means of a draw plate. Such a filament has sufficient consistency and rigidity to be subjected without fear of deterioration to the temperature which it is necessary for it to undergo.

As an example I give the following:

| | | |
|---|---|---|
| Alumina precipitated by ammonia | 3 | parts |
| Oxid of beryllium | 2 | " |
| Silica or silicate of alumina | 1 | " |
| Oxid of thorium | 92.8 | " |
| Oxid of cerium | 1.20 | " |
| | 100.00 | |

The filament thus formed is subjected to a high and even temperature for a long time preferably by an oxyhydrogen blow-pipe adapted to produce this effect. Irregularity of heating or too great suddenness of application might cause deformation of the filament: but the cumulative effect of such heating will at least overcome the resistance of the oxid of beryllium and convert it into a binding agent for holding the still more refractory oxids of the rare earths. In this it will be aided by the silica and alumina. Thorium and cerium are not mentioned to the exclusion of other highly refractory earths of like nature and attributes capable of serving as their substitutes and equivalents; and of course the oxid of either one of the rare earths above mentioned or of such equivalent may be used, instead of dividing the amount of rare earth oxid between two of them. But I prefer the composition filament stated.

Instead of supplying oxid of beryllium to the mixture before heating I may supply the metal beryllium, which will be oxidized in the heating process long before reaching the fusing point of its oxid thereby produced.

Having thus described my invention, what I claim as new and desire to secure by Letters Patent is:

1. A filament consisting of oxid of thorium ninety two and eight tenths per cent., oxid of cerium one and two tenths per cent. and inert auxiliary matter six per cent.

2. The process of manufacturing filaments consisting in the following steps; first mixing a highly refractory oxid of rare earth, such as thorium, with material, such as oxid of beryllium, which is also highly refractory but has a lower point of fusion than such earthy oxid, and supplemental material, such as silica and alumina, and converting this mixture into a pasty mass by adding agglutinant gum; secondly drawing such mass out into filamentary form; thirdly, subjecting the filaments thus formed to a regular intense long continued heat sufficient to melt at last the oxid of beryllium and convert it at last into a binding agent for the oxid of thorium while keeping said filament perfect in form and constitution substantially as set forth.

In testimony whereof I have signed my name to this specification in the presence of two subscribing witnesses.

RENÉ LAIGLE.

Witnesses:
     JULES FAYOLLET,
     EUGÈNE PICHON.